(12) United States Patent
Moon et al.

(10) Patent No.: US 9,379,435 B2
(45) Date of Patent: Jun. 28, 2016

(54) ANTENNA OF MOBILE COMMUNICATION BASE STATION AND METHOD FOR CONTROLLING SAME

(71) Applicant: KMW Inc., Hwaseong, Gyeonggi-Do (KR)

(72) Inventors: Young-Chan Moon, Gyeonggi-Do (KR); Sung-Hwan So, Gyeonggi-Do (KR); Dong-Hun Lee, Gyeonggi-Do (KR); Ki-Hoon Woo, Gyeonggi-Do (KR)

(73) Assignee: KMW Inc., Hwaseong, Gyeonggi-do (KR)

( * ) Notice: Subject to any disclaimer, the term of this patent is extended or adjusted under 35 U.S.C. 154(b) by 0 days.

(21) Appl. No.: 14/640,468

(22) Filed: Mar. 6, 2015

(65) Prior Publication Data
US 2015/0244069 A1   Aug. 27, 2015

Related U.S. Application Data

(63) Continuation of application No. PCT/KR2013/008261, filed on Sep. 12, 2013.

(30) Foreign Application Priority Data

Sep. 14, 2012   (KR) .................. 10-2012-0101922

(51) Int. Cl.
*H01Q 3/04*   (2006.01)
*H01Q 1/24*   (2006.01)
(Continued)

(52) U.S. Cl.
CPC ................. *H01Q 3/04* (2013.01); *H01Q 1/246* (2013.01); *H01Q 3/005* (2013.01); *H01Q 3/32* (2013.01); *H01Q 21/28* (2013.01); *H04W 88/08* (2013.01)

(58) Field of Classification Search
CPC ........... H01Q 3/04; H01Q 3/005; H01Q 3/32; H01Q 1/246; H01Q 21/28
See application file for complete search history.

(56) References Cited

U.S. PATENT DOCUMENTS

| | | | |
|---|---|---|---|
| 6,239,744 B1 | 5/2001 | Singer et al. | |
| 2007/0030208 A1 | 2/2007 | Linehan | |

(Continued)

FOREIGN PATENT DOCUMENTS

| | | |
|---|---|---|
| CN | 102150325 A | 8/2011 |
| CN | 102415206 A | 4/2012 |
| KR | 10-2010-0122092 A | 11/2010 |
| WO | 2009/102775 A2 | 8/2009 |

OTHER PUBLICATIONS

Technical Specification for 3GPP TS 25.463 V7.5.0. Mar. 31, 2007.
(Continued)

*Primary Examiner* — Leon Flores
(74) *Attorney, Agent, or Firm* — Mintz Levin Cohn Ferris Glovsky and Popeo, P.C.; Kongsik Kim; Colleen H. Witherell

(57) ABSTRACT

The present invention relates to an antenna of a mobile communication base station, comprising; an RET driving unit, an RAS driving unit, and an RAB driving unit, each comprising a driving motor, for driving electrical and mechanical devices for respectively adjusting RET, RAS and RAB; and multi-function equipment for controlling the driving of the RET driving unit, the RAS driving unit and the RAB driving unit by communicating with a main system of a base station such that at least a control signal for controlling the RET, the RAS, and the RAB is received.

11 Claims, 16 Drawing Sheets

(51) Int. Cl.
*H01Q 3/00* (2006.01)
*H01Q 3/32* (2006.01)
*H01Q 21/28* (2006.01)
*H04W 88/08* (2009.01)

(56) References Cited

U.S. PATENT DOCUMENTS

2009/0040106 A1 2/2009 Le et al.
2009/0203406 A1 8/2009 Rhodes et al.
2010/0201591 A1* 8/2010 Girard et al. .................. 343/766
2012/0062356 A1 3/2012 Mann et al.
2013/0120202 A1* 5/2013 Lever et al. .................. 343/766

OTHER PUBLICATIONS

Technical Specification for 3GPP TS 25.460 V10.0.1. Mar. 29, 2011.
Technical Specification for 3GPP TS 25.466 V11.2.1. Sep. 8, 2012.

* cited by examiner

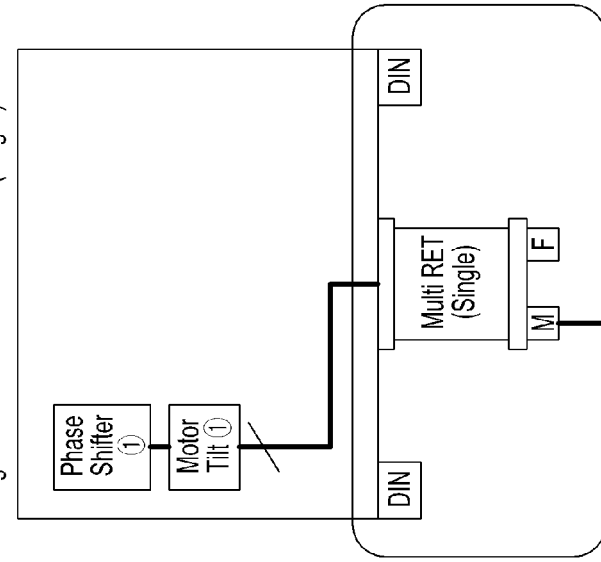
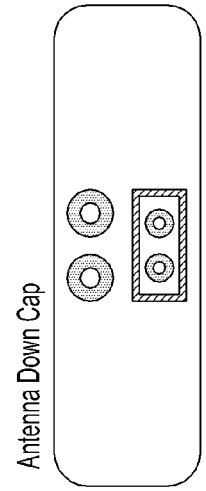
FIG.6C
FIG.6D
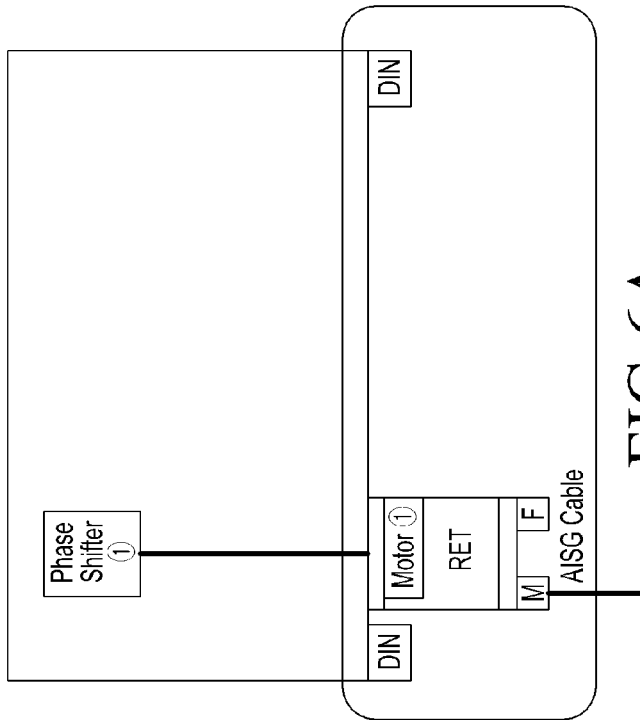
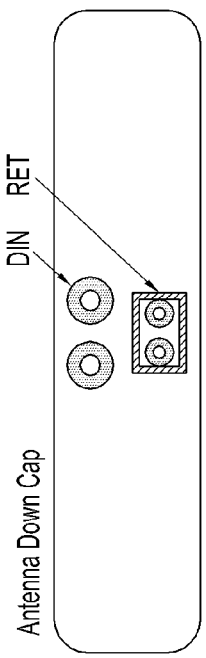
FIG.6A
FIG.6B

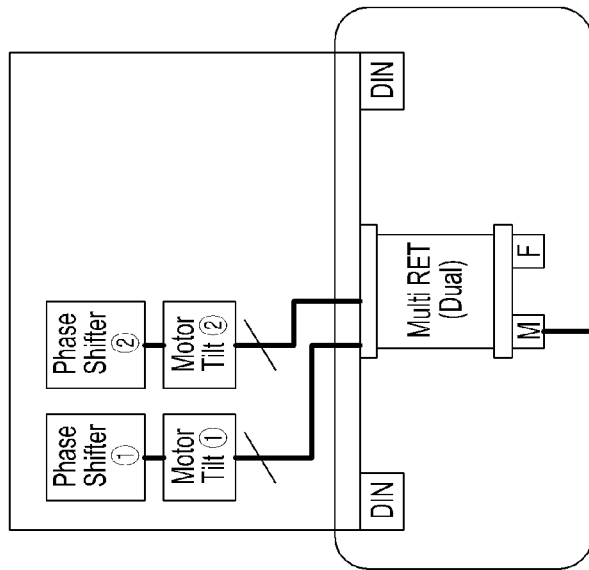
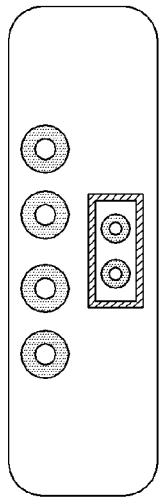
FIG. 7C
FIG. 7D
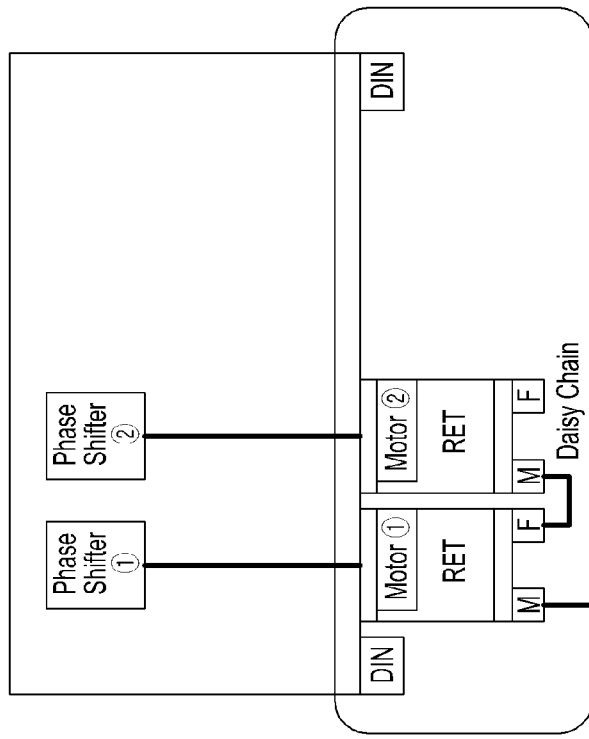
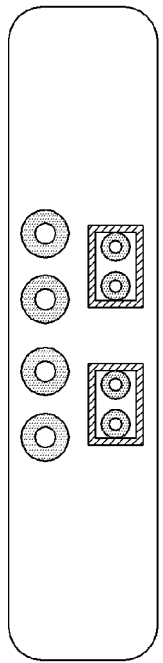
FIG. 7A
FIG. 7B

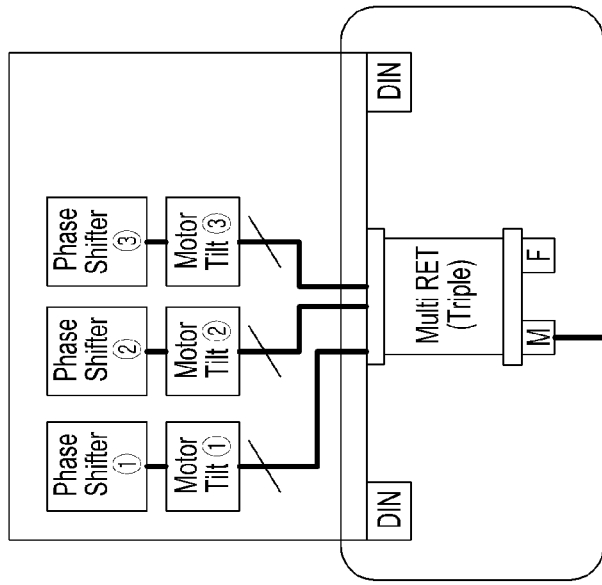
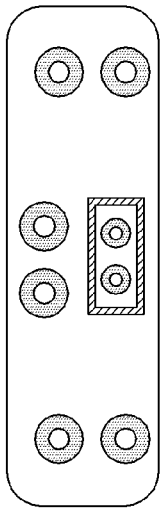
FIG. 8C
FIG. 8D
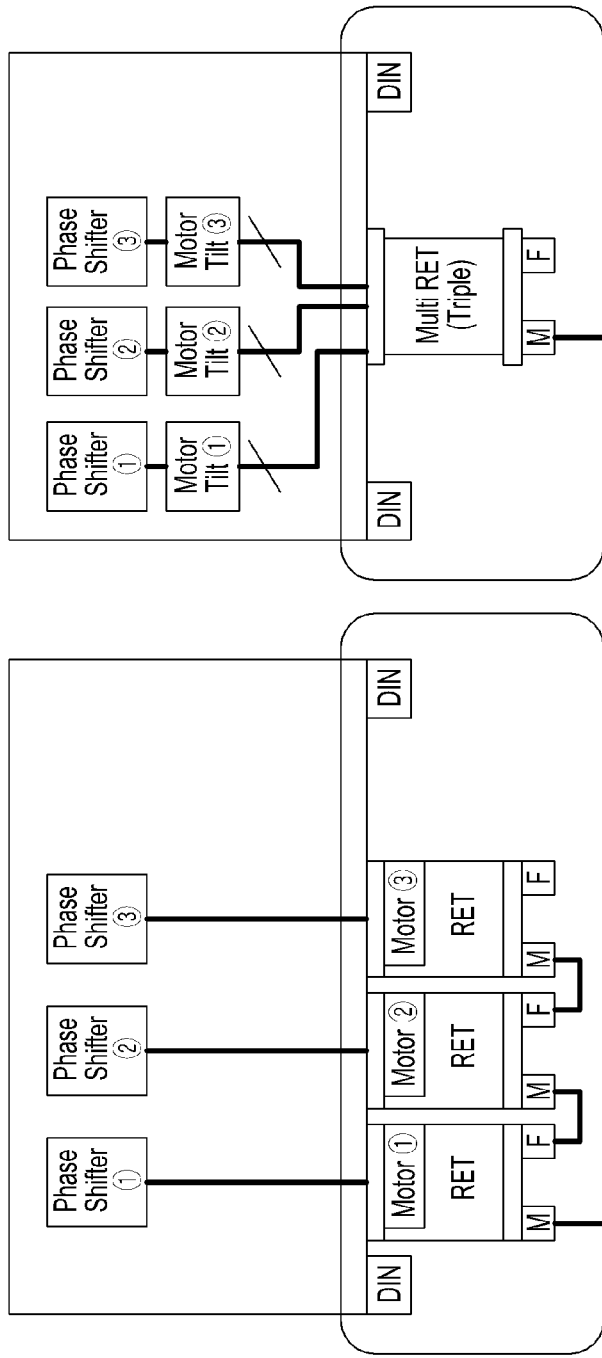
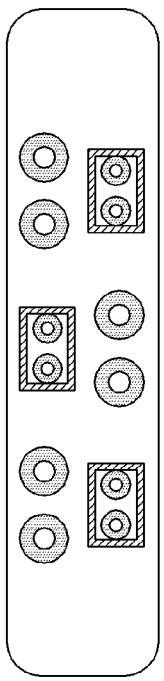
FIG. 8A
FIG. 8B

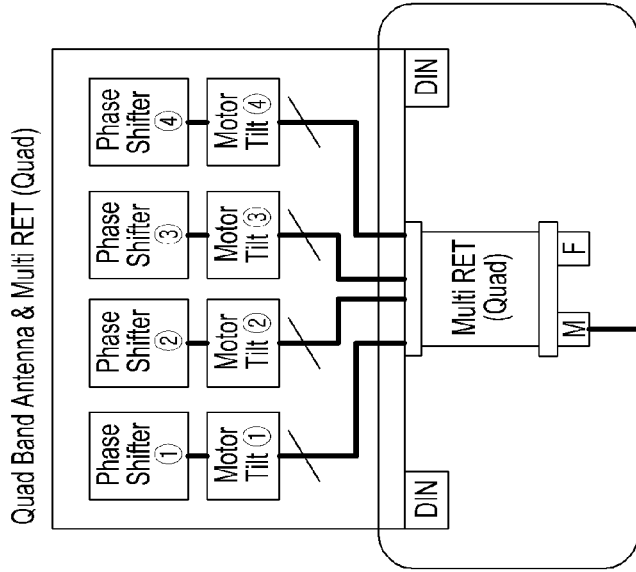
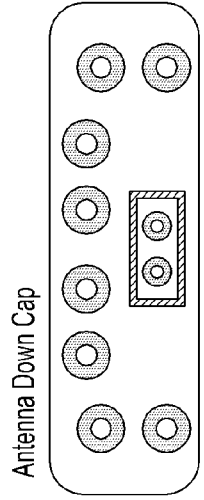
FIG.9A
FIG.9B
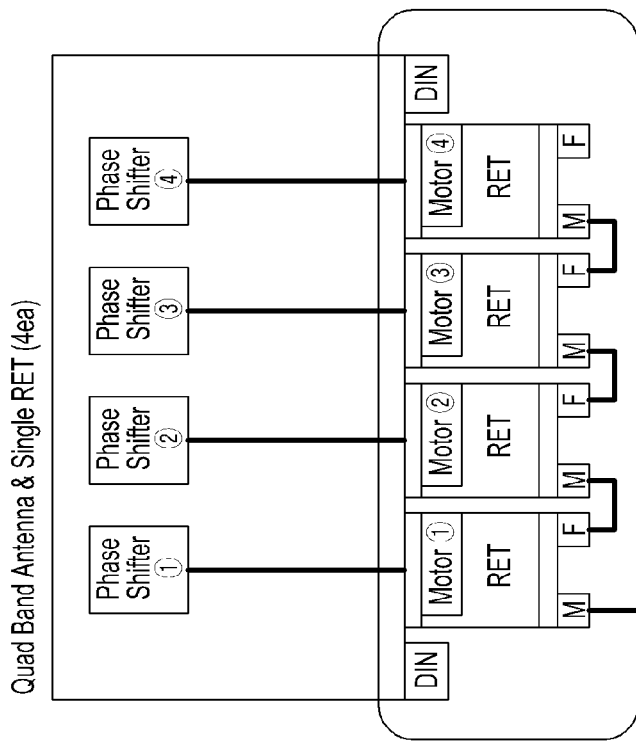
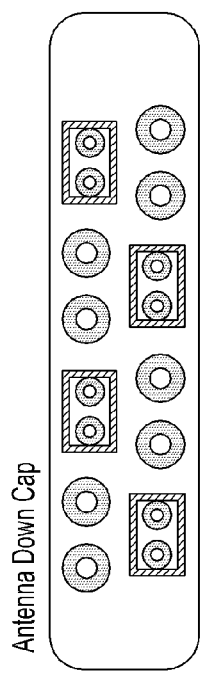
FIG.9B
FIG.9D

<Calibration RAS>

| Direction | | | I or S Field Values | | | | | Status |
|---|---|---|---|---|---|---|---|---|
| (a) Primary → Secondary (HDLC command) | 0x90 PID | 0x03 Length low | 0x00 Length High | 0x4B K | 0x4D M | 0x31 VPC | | Procedure ID : Vendor Specific Procedure (0x90)<br>Data Length (0x03 0x00 3 octets)<br>Vendor Code (0x4B 0x4D : K M)<br>Vendor procedure code<br>(Calibration RAS : 0x31) |
| (b) Secondary → Primary (HDLC response) | 0x90 PID | 0x04 Length low | 0x00 Length High | 0x00 Return code | 0x4B K | 0x4D M | 0x31 VPC | Procedure ID : Vendor Specific Procedure (0x90)<br>Data Length (0x04 0x00 4 octets)<br>Return Code (OK : 0x00)<br>Vendor Code (0x4B 0x4D : K M)<br>Vendor procedure code<br>(Calibration RAS : 0x31) |
| (c) Secondary → Primary | 0x90 PID | 0x02 Length low | 0x00 Length High | 0x0B Return code | 0x25 Return code | | | Procedure ID : Vendor Specific Procedure (0x90)<br>Data Length (0x02 0x00 2 octets)<br>Return Code (Fail : 0x0B)<br>→Unsupported Procedure (0x25) |

FIG.11A

<Set RAS>

(a)

| Direction | | | I or S Field Values | | | | | | | Status |
|---|---|---|---|---|---|---|---|---|---|---|
| Primary → Secondary (HDLC command) | 0x90 PID | 0x05 Length low | 0x00 Length High | 0x4B K | 0x4D M | 0x33 VPC | 0x32 50 | 0x00 0 | | Procedure ID : Vendor Specific Procedure(0x90)<br>Data Length<br>(0x05 0x00 5 octets)<br>Vendor Code<br>(0x4B 0x4D : K M)<br>Vendor procedure code<br>(Set RAS : 0x33)<br>User Set Value is 5.0<br>(0x32 0x00 = 50) |

(b)

| Direction | | | I or S Field Values | | | | | | | Status |
|---|---|---|---|---|---|---|---|---|---|---|
| Secondary → Primary | 0x90 PID | 0x06 Length low | 0x00 Length High | 0x00 Return code | 0x4B K | 0x4D M | 0x33 VPC | 0x32 50 | 0x00 0 | Procedure ID : Vendor Specific Procedure(0x90)<br>Data Length<br>(0x06 0x00 6 octets)<br>Return Code (OK : 0x00)<br>Vendor Code<br>(0x4B 0x4D : K M)<br>Vendor procedure code<br>(Set RAS : 0x33)<br>User Set Value is 5.0<br>(0x32 0x00 = 50) |

(c)

| Direction | | | I or S Field Values | | | Status |
|---|---|---|---|---|---|---|
| Secondary → Primary | 0x90 PID | 0x02 Length low | 0x00 Length High | 0x0B Return code | 0x03 Return code | Procedure ID : Vendor Specific Procedure(0x90)<br>Data Length<br>(0x02 0x00 2 octets)<br>Return Code<br>(Fail : 0x0B) →<br>Actuator Jam (0x03) |

FIG.11B

<Calibration RAB>

| Direction | | | I or S Field Values | | | | | Status |
|---|---|---|---|---|---|---|---|---|
| (a) Primary → Secondary (HDLC command) | 0x90 PID | 0x03 Length low | 0x00 Length High | 0x4B K | 0x4D M | 0x71 VPC | | Procedure ID : Vendor Specific Procedure (0x90) Data Length (0x03 0x00 3 octets) Vendor Code (0x4B 0x4D : K M) Vendor procedure code (Calibration RAB : 0x71) |
| (b) Secondary → Primary (HDLC response) | 0x90 PID | 0x04 Length low | 0x00 Length High | 0x00 Return code | 0x4B K | 0x4D M | 0x71 VPC | Procedure ID : Vendor Specific Procedure (0x90) Data Length (0x04 0x00 4 octets) Return Code (Ok : 0x00) Vendor Code (0x4B 0x4D : K M) Vendor procedure code (Calibration RAB : 0x71) |
| (c) Secondary → Primary (HDLC response) | 0x90 PID | 0x02 Length low | 0x00 Length High | 0x0B Return code | 0x25 Return code | | | Procedure ID : Vendor Specific Procedure (0x90) Data Length (0x02 0x00 2 octets) Return Code (Fail : 0x0B) →Unsupported Procedure (0x25) |

<Set RAB>

| | Direction | I or S Field Values | | | | | | | | Status |
|---|---|---|---|---|---|---|---|---|---|---|
| (a) | Primary → Secondary (HDLC command) | 0x90<br>PID | 0x05<br>Length low | 0x00<br>Length High | 0x4B<br>K | 0x4D<br>M | 0x73<br>VPC | 0x53<br>83 | 0x00<br>0 | Procedure ID : Vendor Specific Procedure(0x90)<br>Data Length<br>(0x05 0x00 5 octets)<br>Vendor Code<br>(0x4B 0x4D : K M)<br>Vendor procedure code<br>(Set RAB : 0x73)<br>User Set Value is 8.3<br>(0x53 0x00 = 83) |
| (b) | Secondary → Primary (HDLC response) | 0x90<br>PID | 0x06<br>Length low | 0x00<br>Length High | 0x00<br>Return code | 0x4B<br>K | 0x4D<br>M | 0x73<br>VPC | 0x53<br>83 | 0x00<br>0 | Procedure ID : Vendor Specific Procedure(0x90)<br>Data Length<br>(0x06 0x00 6 octets)<br>Return Code (Ok : 0x00)<br>Vendor Code<br>(0x4B 0x4D : K M)<br>Vendor procedure code<br>(Set RAB : 0x73)<br>User Set Value is 8.3<br>(0x53 0x00 = 83) |
| (c) | Secondary → Primary (HDLC response) | 0x90<br>PID | 0x02<br>Length low | 0x00<br>Length High | 0x0B<br>Return code | 0x0E<br>Return code | | | | | Procedure ID : Vendor Specific Procedure(0x90)<br>Data Length<br>(0x02 0x00 2 octets)<br>Return Code<br>(Fail : 0x0B) →<br>Not Calibrated (0x0E) |

FIG.13A

<Calibration Single RET>

| Direction | | I or S Field Values | | | | | Status |
|---|---|---|---|---|---|---|---|
| (a) | Primary → Secondary (HDLC command) | 0x31 PID | 0x00 Length low | 0x00 Length High | | | Procedure ID : Calibrate RET (0x31) Data Length (0x00 0x00 0 octets) |
| (b) | Secondary → Primary (HDLC response) | 0x31 PID | 0x01 Length low | 0x00 Length High | 0x00 Return code | | Procedure ID : Calibrate RET (0x31) Data Length (0x01 0x00 1 octets) Return Code (Ok : 0x00) |
| (c) | Secondary → Primary (HDLC response) | 0x31 PID | 0x02 Length low | 0x00 Length High | 0x0B Return code | 0x19 Return code | Procedure ID : Calibrate RET (0x31) Data Length (0x02 0x00 2 octets) Return Code (Fail : 0x0B) →Unknown Procedure(0x19) |

<Set Single RET>

| | Direction | I or S Field Values | | | | | Status |
|---|---|---|---|---|---|---|---|
| (a) | Primary → Secondary<br>(HDLC command) | 0x33<br>PID | 0x02<br>Length low | 0x00<br>Length High | 0x64<br>100 | 0x00<br>0 | Procedure ID : Set Tilt (0x33)<br>Data Length (0x02 0x00 2 octets)<br>User Set Value is 10.0 (0x64 0x00 = 100) |
| (b) | Secondary → Primary<br>(HDLC response) | 0x33<br>PID | 0x01<br>Length low | 0x00<br>Length High | 0x00<br>Return code | | Procedure ID : Set Tilt (0x33)<br>Data Length (0x00 1 octets)<br>Return Code (Ok : 0x00) |
| (c) | Secondary → Primary<br>(HDLC response) | 0x33<br>PID | 0x02<br>Length low | 0x00<br>Length High | 0x0B<br>Return code | 0x0E<br>Return code | Procedure ID : Set Tilt (0x33)<br>Data Length (0x02 0x00 2 octets)<br>Return Code (Fail : 0x0B)<br>→ Not Calibrated (0x0E) |

<Calibration DUAL RET>

| | Direction | I or S Field Values | | | | | | Status |
|---|---|---|---|---|---|---|---|---|
| (a) | Primary → Secondary (HDLC command) | 0x80 PID | 0x01 Length low | 0x00 Length High | 0x01 Ant. No | | | Procedure ID : Antenna Calibrate RET (0x80) Data Length (0x01 0x00 1 octets) Antenna Number (0x01 1 First Ant.) |
| (b) | Secondary → Primary (HDLC response) | 0x80 PID | 0x02 Length low | 0x00 Length High | 0x01 Ant. No | 0x00 Return code | | Procedure ID : Antenna Calibrate RET (0x80) Data Length (0x01 0x00 1 octets) Antenna Number (0x01 1 First Ant.) Return Code (Ok : 0x00) |
| (c) | Secondary → Primary (HDLC response) | 0x80 PID | 0x03 Length low | 0x00 Length High | 0x01 Ant. No | 0x0B Return code | 0x03 Return code | Procedure ID : Antenna Calibrate RET (0x80) Data Length (0x03 0x00 3 octets) Antenna Number (0x01 1 First Ant.) Return Code (Fail : 0x0B) → Actuator Jam(0x03) |

<Set DUAL RET>

| Direction | I or S Field Values | | | | | | Status |
|---|---|---|---|---|---|---|---|
| (a) Primary → Secondary (HDLC command) | 0x81 PID | 0x03 Length low | 0x00 Length High | 0x02 Ant. No | 0x64 100 | 0x00 0 | Procedure ID : Antenna Set Tilt (0x81)<br>Data Length (0x03 0x00 3 octets)<br>Antenna Number (0x02 2 Second Ant.)<br>User Set Value is 10.0 (0x64 0x00=100) |
| (b) Secondary → Primary (HDLC response) | 0x81 PID | 0x02 Length low | 0x00 Length High | 0x02 Ant. No | 0x00 Return code | | Procedure ID : Antenna Set Tilt (0x81)<br>Data Length (0x02 0x00 2 octets)<br>Antenna Number (0x02 2 Second Ant.)<br>Return Code (Ok : 0x00) |
| (c) Secondary → Primary (HDLC response) | 0x81 PID | 0x03 Length low | 0x00 Length High | 0x02 Ant. No | 0x0B Return code | 0x13 Return code | Procedure ID : Antenna Set Tilt (0x81)<br>Data Length (0x02 0x00 2 octets)<br>Antenna Number (0x02 2 Second Ant.)<br>Return Code (Fail : 0x0B) → Out of Range (0x13) |

FIG. 14B

ANTENNA OF MOBILE COMMUNICATION BASE STATION AND METHOD FOR CONTROLLING SAME

CROSS REFERENCE TO RELATED APPLICATIONS

This application is a continuation of International Application No. PCT/KR2013/008261 filed on Sep. 12, 2013, which claims priority to Korean Application No. 10-2012-0101922 filed on Sep. 14, 2012, which applications are incorporated herein by reference.

TECHNICAL FIELD

The present disclosure relates to an antenna of a mobile communication base station and, more particularly, to an antenna to which the Antenna Interface Standards Group (AISG) protocol is applied and a control method thereof.

BACKGROUND ART

A currently widely used antenna of a mobile communication base station generally has a structure in which a plurality of radiating elements is vertically arranged which can transmit or receive an electric wave using two polarized waves (generally, X-shaped polarized waves) perpendicular to each other. A plane of polarization of the X-shaped polarized waves is basically arranged to be inclined at an angle of +45 degrees or −45 degrees with respect to a horizontal or vertical plane.

In this case, the antenna commonly includes a Remote Azimuth Steering (RAS) device for remotely controlling azimuth steering and a Remote Azimuth Beam-width (RAB) device for remotely controlling an azimuth beam-width as well as a Remote Electrical Tilt (RET) device that is remotely controllable and electronically controls a down tilt angle. An example of an antenna including the devices is disclosed in Korean Patent Publication No. 10-2010-0122092 first filed by Amphenol Corporation (published on Nov. 19, 2010 and entitled "Multi-beam Antenna with Multi-device Control Unit"; inventors Gregory Girard and Frank Soulie).

For control of the RET device, the RAS device, and the RAB device, Antenna Interface Standards Group (AISG) v2.1.0 was recently devised, and a communication scheme through 3rd Generation Partnership Project (3GPP) protocol was also developed.

Referring to FIG. 1, according to the AISG standards, the RET control is mainly divided into a control by a primary station and a control by a secondary station. As a master part, the primary station refers to a part, such as a Master Control Unit (MCU) 22, which may be provided in a main system of a base station to transmit a control signal, and as a slave part, the secondary station refers to a part, such as an RET 14 and an ALD modem 13, which may receive the control signal to perform an operation according to the corresponding control signal. A mobile communication base station may generally include an antenna system installed at a higher place such as a building or pillar, a main system of the base station installed on the ground, and a feeder cable for connecting the antenna system and the main system, in which the primary station may correspond to the main system of the base station, and the secondary station may correspond to the antenna system.

Referring to FIG. 1, a base station main unit 21 transmits an RF signal through a feeder cable, and the MCU 22 transmits a DC signal and an RS485 communication signal to drive the RET device 14. The signals transmitted from the base station main unit 21 and the MCU 22 are converted and synthesized into DC signal+RF signal+OOK signal through a Bottom ALD modem 23. The synthesized signal is transmitted to the lower end of the antenna through the feeder cable again. A Top ALD modem 13 of the antenna system filters out DC signal+OOK signal and provides the filtered signal to the RET device 14 to help the RET device 14 receive a command. In addition, the modem 13 provides an RF signal to transmission/reception antennas 11 and 12 of the antenna 10. The signals received by the transmission/reception antennas 11 and 12 of the antenna 10 are provided to the base station main unit 21 through the feeder cable.

FIGS. 2 and 3 illustrate structures in which an RET device, an RAS device, and an RAB device are installed in an antenna according to the AISG rules. In FIG. 2, an RET device 14, an RAS device 15, and an RAB device 16 are connected to the outside through a plurality of AISG connectors installed on a lower cap of an antenna 10 and are connected to one another by the daisy chain method using AISG cables through the AISG connectors. In this case, the connection may be made to primarily provide an external DC+RS485 signal to the RET device 14.

In FIG. 3, an RET device 14 is connected to the outside through an AISG connector installed on a lower cap of an antenna 10, and the RET device 14, an RAS device 15, and an RAB device 16 are connected to one another in an enclosure of the antenna 10 by the daisy chain method using AISG cables.

However, according to the current AISG rules, for RET, RAS, and RAB control, the RET device 14, the RAS device 15, and the RAB device 16 have to be provided in the antenna 10 and connected to one another using the AISG cables as described above, thereby causing a cost increase due to device installation and problems involving installation space and weight. In addition, the main system of the base station has to perform control signal transmission/reception procedures for the RET device 14, the RAS device 15, and the RAB device 16, respectively, thereby resulting in complex communication procedures. The problems are more serious for the dual, triple, and quad-band antennas.

SUMMARY

An aspect of the present disclosure is to provide an antenna of a mobile communication base station and a control method thereof which can simplify control target devices installed therein, thereby decreasing costs according to installation of the devices, reducing installation space and weight, and more efficiently controlling the devices by a main system of the base station.

In accordance with one aspect of the present disclosure, an antenna of a mobile communication base station is provided. The antenna includes: an RET drive unit, an RAS drive unit, and an RAB drive unit that drive electrical and mechanical apparatuses for adjusting RET, RAS, and RAB, respectively, each of which includes a drive motor; and a multifunctional device that communicates with a main system of the base station to receive control signals for the RET, RAS, and RAB control and controls the driving of the RET drive unit, the RAS drive unit, and the RAB drive unit.

In accordance with another aspect of the present disclosure, a method of controlling an antenna of a mobile communication base station that is a secondary device performing a control operation by transmitting/receiving a High-level Data-Link Control (HDLC) message according to the Antenna Interface Standards Group (AISG) rules to/from a primary device is provided. The method includes: receiving the HDLC message from the primary device; identifying whether the received HDLC message corresponds to an Information Frame (I-Frame) format and extracting a procedure ID from the corresponding I-Frame; identifying whether the current I-Frame is associated with a vendor procedure set in advance as a vendor specific procedure, by identifying the extracted procedure ID, and identifying a vendor procedure code that is information set in advance to control the RAS or the RAB; controlling the RAS or the RAB set in advance according to the identified vendor procedure code; and informing the primary device of a result obtained by controlling the RAS or the RAB through a response message.

BRIEF DESCRIPTION OF THE DRAWINGS

FIGS. 6A, 6B, 6C and 6D illustrate examples of a comparison between a lower cap of an antenna of a mobile communication base station according to first embodiment of the present disclosure and that in the related art;

FIGS. 7A, 7B, 7C and 7D illustrate examples of a comparison between a lower cap of an antenna of a mobile communication base station according to second embodiment of the present disclosure and that in the related art;

FIGS. 8A, 8B, 8C and 8D illustrate examples of a comparison between a lower cap of an antenna of a mobile communication base station according to third embodiment of the present disclosure and that in the related art;

FIGS. 9A, 9B, 9C and 9D illustrate examples of a comparison between a lower cap of an antenna of a mobile communication base station according to fourth embodiment of the present disclosure and that in the related art;

FIGS. 11A and 11B illustrate format examples of transmission frames between primary and secondary devices for RAS control of a base station antenna according to an embodiment of the present disclosure;

FIGS. 12A and 12B illustrate format examples of transmission frames between primary and secondary devices for RAB control of a base station antenna according to another embodiment of the present disclosure;

FIGS. 13A and 13B illustrate format examples of transmission frames between primary and secondary devices for RET control of a base station antenna having a single band structure according to another embodiment of the present disclosure; and FIGS. 14A and 14B illustrate format examples of transmission frames between primary and secondary devices for RET control of a base station antenna according to another embodiment of the present disclosure.

DETAILED DESCRIPTION

Hereinafter, exemplary embodiments of the present disclosure will be described in detail with reference to the accompanying drawings. Various specific definitions found in the following description are provided only to help general understanding of the present invention, and it is apparent to those skilled in the art that the present invention can be implemented without such definitions.

Figure 1:
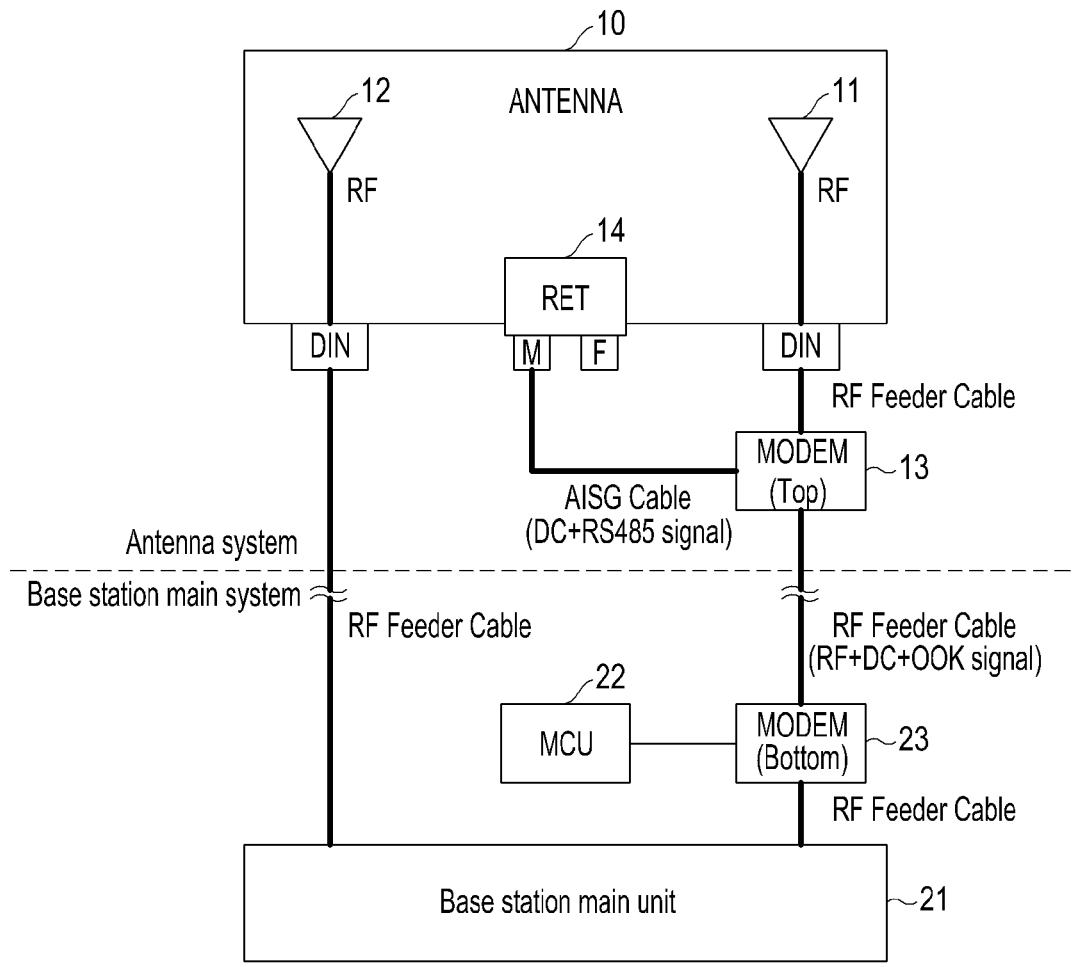
FIG. 1 is a block diagram illustrating an example of an antenna of a mobile communication base station for RET control according to the related art.
Figure 2:
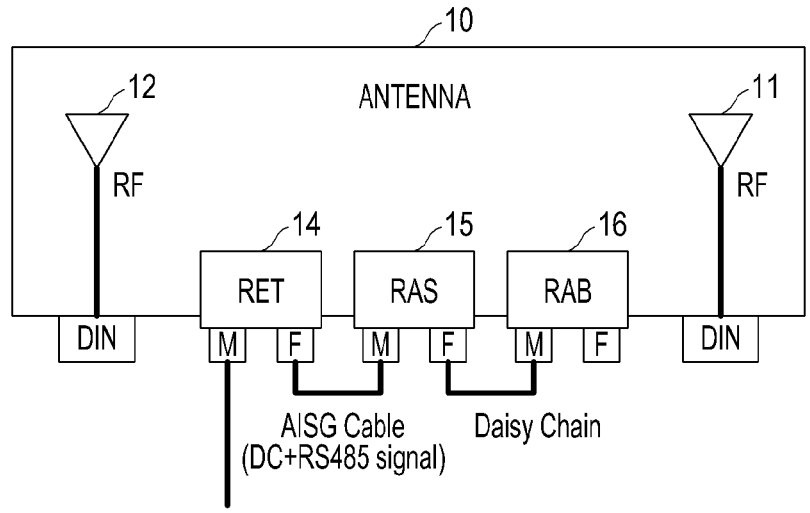
FIG. 2 is a block diagram illustrating an example of an antenna of a mobile communication base station for RET, RAS, and RAB control according to the related art.
Figure 3:
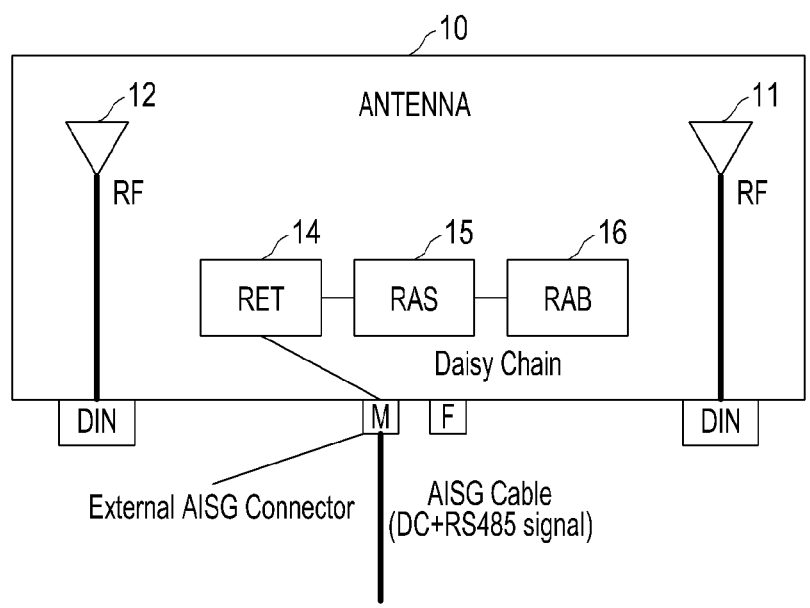
FIG. 3 is a block diagram illustrating another example of an antenna of a mobile communication base station for RET, RAS, and RAB control according to the related art.
Figure 4:
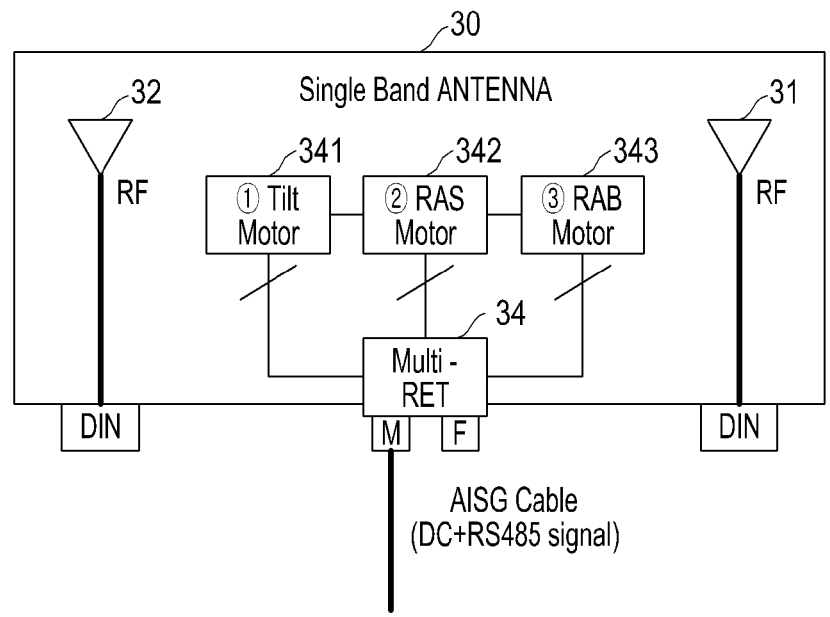
FIG. 4 is a block diagram of an antenna of a mobile communication base station for RET, RAS, and RAB control according to an embodiment of the present disclosure.

FIG. 4 is a block diagram of an antenna of a mobile communication base station for RET, RAS, and RAB control according to an embodiment of the present disclosure, and a single-band antenna 30 including transmission/reception antenna units 31 and 32 is illustrated in FIG. 4. Referring to FIG. 4, the antenna 30 of the mobile communication base station according to the embodiment of the present disclosure includes: an RET drive unit 341, an RAS drive unit 342, and an RAB drive unit 343 that drive electrical and mechanical apparatuses for adjusting RET, RAS, and RAB, respectively, each including a drive motor; and a multifunctional device 34 (referred to as multi-RET) that communicates with the main system (not illustrated) of the base station to receive control signals for at least RET, RAS, and RAB control and controls the driving of the RET drive unit 341, the RAS drive unit 342, and the RAB drive unit 343.

The multifunctional device 34 is connected to the outside through an AISG connector placed on a lower cap of the antenna 30 and receives an external DC+RS485 signal through the AISG connector using an AISG cable.

Figure 5:
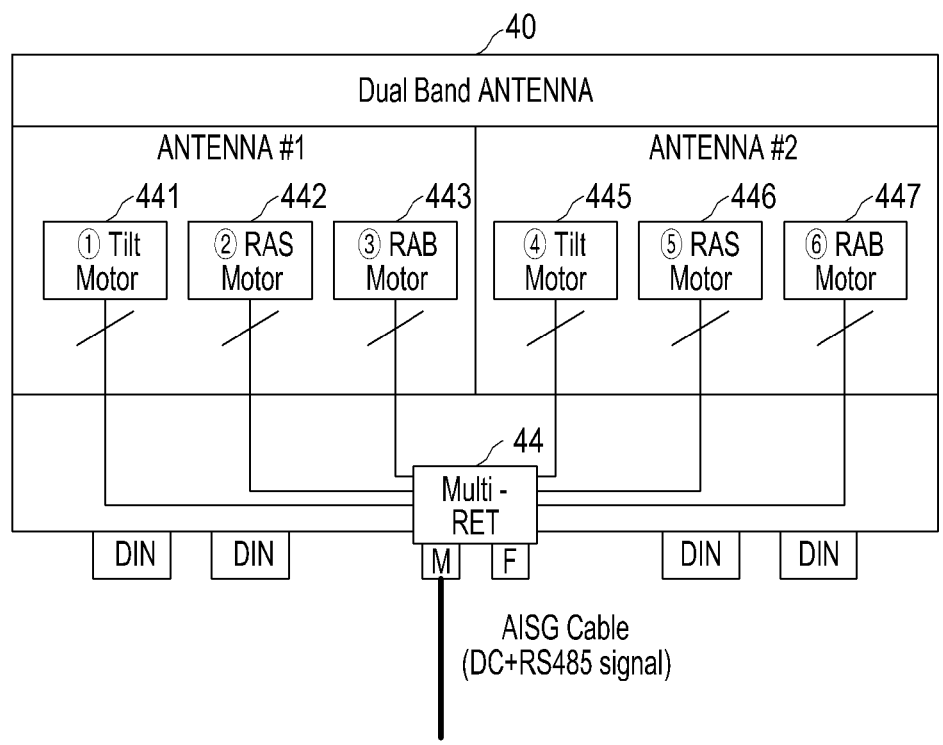
FIG. 5 is a block diagram of an antenna of a mobile communication base station for RET, RAS, and RAB control according to another embodiment of the present disclosure.

FIG. 5 is a block diagram of an antenna of a mobile communication base station for RET, RAS, and RAB control according to another embodiment of the present disclosure, and a dual-band antenna 40 including a pair of transmission/reception antenna units for each of two bands (a total of four antennas) is illustrated in FIG. 5. That is, the dual-band antenna 40 includes a first antenna (#1) which includes transmission/reception antenna units of a first band and a second antenna (#2) which includes transmission/reception antenna units of a second band. For convenience of description, the transmission/reception antenna units are omitted in FIG. 5.

Referring to FIG. 5, the antenna 40 of the mobile communication base station according to the other embodiment of the present disclosure includes: an RET drive unit 441, an RAS drive unit 442, and an RAB drive unit 443 that drive electrical and mechanical apparatuses for adjusting RET, RAS, and RAB of the first antenna (#1), respectively; and an RET drive unit 445, an RAS drive unit 446, and an RAB drive unit 447 that drive electrical and mechanical apparatuses for adjusting RET, RAS, and RAB of the second antenna (#2), respectively. In this case, a multifunctional device 44 according to the present disclosure communicates with a main system (not illustrated) of the base station to receive control signals for RET, RAS, and RAB control and controls the driving of the RET drive units 441 and 445, the RAS drive units 442 and 446, and the RAB drive units 443 and 447 of the first antenna (#1) and the second antenna (#2).

The multifunctional device 44 is connected to the outside through an AISG connector placed on a lower cap of the antenna 40 and receives an external DC+RS485 signal through the AISG connector using an AISG cable.

As illustrated in FIGS. 4 and 5, the antennas according to the present disclosure adjust the tilt, the azimuth steering, and the azimuth beam-width using only one multifunctional device. Therefore, there is no need for three types of devices, unlike the related art, thereby reducing installation space and costs. In addition, it is more efficient in a triple-band antenna as well as in a dual-band antenna, to use one multifunctional device. Furthermore, the number of AISG cables is further decreased when one multifunctional device is used than when typical RET, RAS, and RAB devices are connected to one another through the daisy chain method, thereby reducing costs. Of course, even in this case, costs are further reduced in a triple-band antenna as well as in a dual-band antenna.

FIGS. 6A to 9D illustrate examples of a comparison between the lower cap of an antenna of a mobile communication base station, according to first to fourth embodiments of the present disclosure, and that in the related art. Examples of single, dual, triple, and quad-band antennas are illustrated in FIGS. 6A-6D, 7A-7D, 8A-8D, and 9A-9D, respectively. In FIGS. 6A to 9D, FIGS. 6A, 7A, 8A, and 9A illustrate the structure of an antenna in the related art and FIGS. 6B, 7B, 8B, and 9B illustrate a lower cap in the related art. FIGS. 6C, 7C, 8C, and 9C illustrate the structure of an antenna according to the embodiments of the present disclosure and FIGS. 6D, 7D, 8D, and 9D illustrate a lower cap according to the embodiments of the present disclosure.

Referring to FIG. 6A to 6D, in the case of a single-band antenna, lower caps of antennas according to the related art and the present disclosure include a pair of DIN connectors for connecting transmission and reception antenna units with feeder cables and a pair of AISG connectors for connecting one RET device with external AISG cables. In this case, the lower caps of the antennas according to the related art and the present disclosure may have the same structure.

However, as illustrated in FIGS. 7A to 9D, dual-, triple-, and quad-band antennas include two or more RET devices in the related art and therefore, the lower caps of the antennas have to include both DIN connectors for transmission/reception antenna units and AISG connectors for connecting the RET devices with external AISG cables. In this case, the AISG cables are required to connect the RET devices through the daisy chain method. Although not illustrated in FIGS. 6A to 9D for convenience of description, when RAS and RAB devices are added to the antennas, AISG cables for connecting the RAS and RAB devices are required in the related art.

In contrast, according to the present disclosure, only one RET device (i.e., one multifunctional device) is provided at the lower cap; therefore, only one pair of AISG connectors are required to connect the RET device with external AISG cables.

As illustrated in FIGS. 6A to 9D, when the RET devices are installed according to the related art, the number of RET devices is increased as the number of antennas to be installed is increased for each frequency band. However, in the present disclosure, the number of RET devices is not increased, thereby achieving a cost reduction effect. In addition, the number of AISG cables for connecting the RET devices is reduced in the present invention, as compared with the related art, thereby saving costs.

As the number of RET devices is decreased, the number of addresses necessary for control is also decreased. That is, in the present disclosure, it is possible to control antennas installed for multiple frequency bands, by using only one multifunctional device (the same number of addresses), thereby achieving enhanced expandability (in the related art, one band antenna is controlled for one RET device and therefore, there is no expandability).

Furthermore, in the related art, an available space of a lower cap of an antenna becomes narrower as the number of RET devices is increased. Accordingly, a space for arrangement of the DIN connectors becomes narrower. As a result, the lower cap of the antenna has to be designed to have a large area, or the DIN connectors, when fastened, interfere with each other due to the narrow arrangement space. In addition, since the number of AISG cables is also increased, it is difficult to connect the several AISG cables. In contrast, in the present disclosure, the DIN connectors and the AISG cables are easy to install in the same lower cap area of the antenna, compared to the related art.

Figure 10:
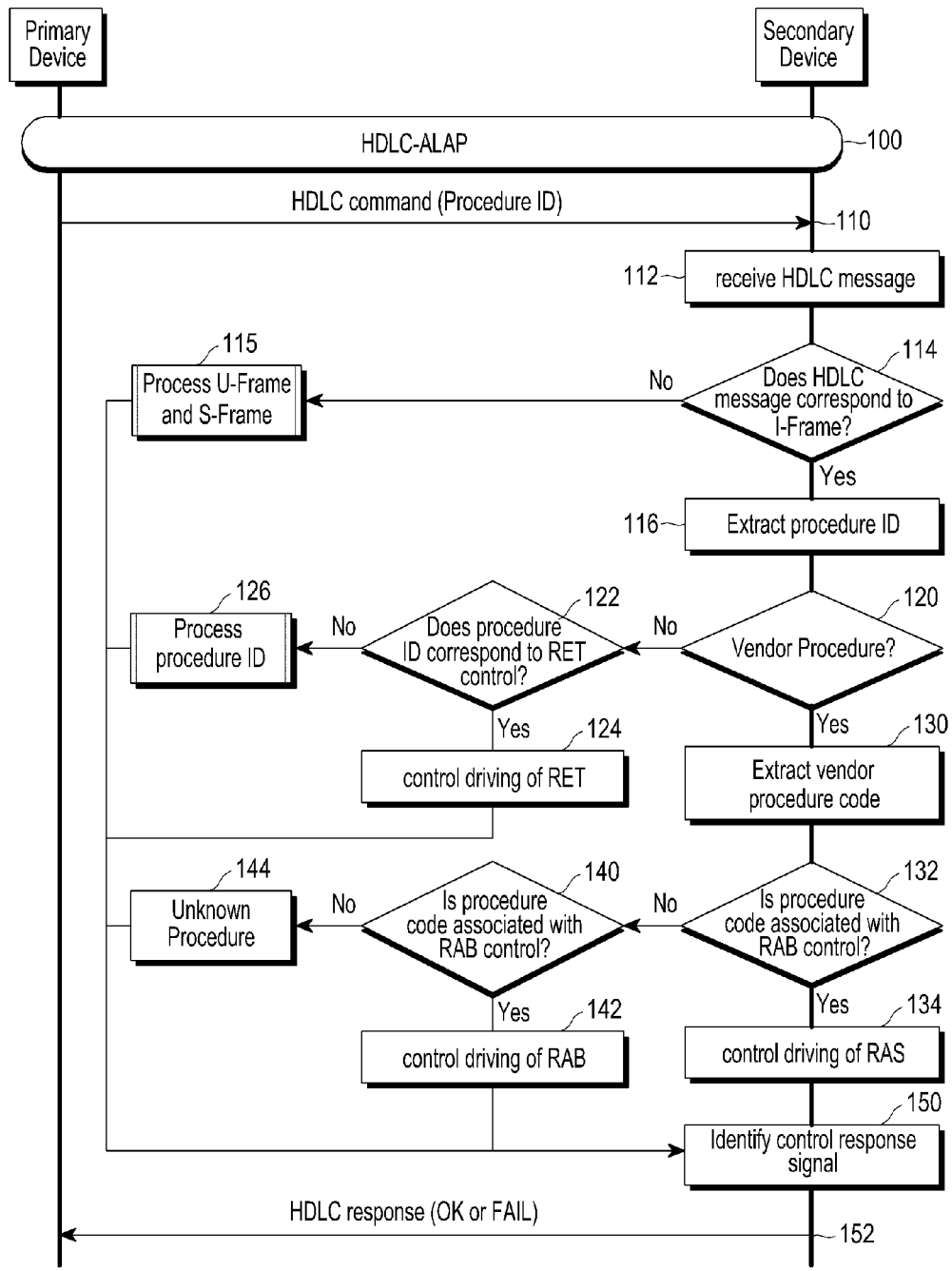
FIG. 10 is a signal flow diagram for controlling an antenna of a mobile communication base station according to an embodiment of the present disclosure.

FIG. 10 is a signal flow diagram for controlling an antenna of a mobile communication base station according to an embodiment of the present disclosure. In FIG. 10, a primary device may correspond to an MCU of a base station main system, and a secondary device may correspond to a multifunctional device of the antenna according to the present disclosure. Referring to FIG. 10, in step 100, an initial access operation between the primary and secondary devices is performed according to the AISG rules, and in step 110, the primary device transmits, to the second device, a High-level Data-Link Control (HDLC) message for an HDLC command (Procedure ID) according to the AISG rules. The secondary device receives the HDLC message in step 112 and identifies whether the HDLC message corresponds to an Information Frame (I-Frame) format configured in advance for RET, RAS, and RAB control, in step 114. When the HDLC message corresponds to the I-Frame format, the secondary device proceeds to step 116, and when the HDLC message does not correspond to the I-Frame format, the secondary device proceeds to step 115 to perform other operations, namely, an operation of processing an Unnumbered Frame (U-Frame) used for system management or a Supervisory Frame (S-Frame) used for link control. That is, in the embodiment of the present disclosure, the command for the RET, RAS, and RAB control is transmitted by using the I-Frame carrying user information and control information of the corresponding user information.

In step 116, the secondary device extracts a procedure ID from the I-Frame. In step 120, the secondary device identifies whether the current I-Frame is associated with a vendor procedure previously configured as a vendor specific procedure, using the procedure ID extracted in step 116. If so, the secondary device proceeds to step 130, and if not, the secondary device proceeds to step 122. That is, in the embodiment of the present disclosure, the vendor procedure ID may be configured in advance in the I-Frame to represent the RAS and RAB control, and the vendor procedure ID may be determined as, for example, "0x90." In step 130, the secondary device identifies, from the I-Frame, preset information, for example a vendor procedure code, for the RAS or RAB control according to the embodiment of the present disclosure. In step 132, the secondary device identifies whether the identified vendor procedure code is associated with the RAS control. If so, the secondary device controls the driving of the RAS, such as generating a drive signal for the RAS drive unit according to the identified vendor procedure code, in step 134.

When it is identified in step 132 that the identified vendor procedure code is not associated with the RAS control, the secondary device proceeds to step 140 to identify whether the vendor procedure code is associated with the RAB control. In step 142, the secondary device controls the RAB drive unit according to the identification result.

When it is identified in step 140 that the vendor procedure code is not associated with the RAB control, the secondary device proceeds to step 144 and determines that the identified vendor procedure code corresponds to an undesignated procedure code. In this case, the secondary device determines an operating response according to the corresponding procedure code as failure.

When it is identified in step 120 that the extracted procedure ID is not the vendor procedure ID, the secondary device proceeds to step 122 to identify whether the corresponding procedure ID corresponds to a procedure ID configured in advance for the RET control. The procedure ID for the RET control may be determined as, for example, "0x31." When it is determined in step 122 that the procedure ID corresponds to the RET control, the secondary device proceeds to step 124 to identify RET driving information in the corresponding frame and controls the driving of the RET, such as generating a drive signal for the RET drive unit. In contrast, when it is determined in step 122 that the procedure ID does not correspond to the RET control, the secondary device proceeds to step 126 to perform an operation according to the corresponding procedure ID.

Through the above-described steps, the corresponding secondary device performs the operations of processing the command (frame) received from the primary device. Thereafter, in step 150, the secondary device identifies the processing result of the operations, such as identifying control response signals from the RET drive unit, the RAS drive unit, and the RAB drive unit. Then, in step 152, the secondary device transmits, to the primary device, an HDLC response message informing whether the operations have been normally performed.

FIGS. 11A and 11B illustrate format examples of transmission frames between primary and secondary devices for RAS control of a base station antenna according to an embodiment of the present disclosure. FIG. 11A illustrates frames associated with calibration control for adjusting an RAS drive unit to an initial value, and FIG. 11B illustrates frames associated with set control for driving the RAS drive unit with a particular value.

Referring to FIG. 11A, an example of a frame format corresponding to an RAS calibration command transmitted from a primary device to a secondary device is illustrated in FIG. 11A (a). As illustrated in FIG. 11A (a), the corresponding frame may include a procedure ID field (PID) of one octet, frame length fields (Length low and Length high) of two octets, vendor code fields of two octets, and a vendor procedure code field (VPC) of one octet.

The value of the procedure ID field is set to, for example, "0x90" of an "Unsigned integer" type and represents that the corresponding frame is associated with a vendor specific procedure. As a code assigned to each vendor for identifying the corresponding vendor, the vendor code may be set to, for example, "0x4B, 0x4D" of the ASCII code type representing "KM." The vendor procedure code may be set to, for example, "0x31" which means an RAS calibration command according to the embodiment of the present disclosure. The frame length field of two octets is set to "0x03, 0x00" since the length of a data octet at a rear end of the corresponding frame length field is three octets.

FIG. 11A (b) and (c) illustrate an example of a frame format corresponding to a response message according to the performance of the RAS calibration command transmitted from the secondary device to the primary device. FIG. 11A (b) corresponds to a message informing that an operation is normally performed, and FIG. 11A (c) corresponds to a message informing that an operation is not normally performed. As illustrated in FIG. 11A (b), the frame for informing of the normal performance of the operation for the RAS calibration command may include a procedure ID field (PID) of one octet, frame length fields (Length low and Length high) of two octets, a return code field of one octet, vendor code fields of two octets, and a vendor procedure code field (VPC) of one octet.

The value of the procedure ID field, the vendor code, and the vendor procedure code may be set to "0x90," "0x4B, 0x4D," and "0x31," respectively, as in FIG. 11A (a). In this case, the return code field may be set to, for example, "0x00" representing the normal performance of an operation (OK).

Referring to FIG. 11A (c), the frame informing of the failure in performance of the operation for the RAS calibration command may include a procedure ID field (PID) of one octet, frame length fields of two octets (Length low and Length high), and a return code field of at least one octet. In addition, the frame may also further include a vendor procedure code field (not illustrated) of one octet, if necessary.

The value of the procedure ID field is set to "0x90" as in FIG. 11A (a). In this case, the return code field includes, for example, "0x0B" of one octet representing the failure in performance of the operation. A value of at least one octet for representing more detailed information on the failure in performance of the operation may be additionally set in the return code field. For example, the value is set to "0x25" representing an unsupported procedure in FIG. 11A (c).

Next, referring to FIG. 11B, an example of a frame format corresponding to an RAS set command transmitted from a primary device to a secondary device is illustrated in FIG. 11B (a). As illustrated in FIG. 11B (a), the corresponding frame may include a procedure ID field of one octet, frame length fields of two octets, vendor code fields of two octets, a vendor procedure code field (VPC) of one octet, and RAS set value fields of two octets, as in FIG. 11A (a).

The value of the procedure ID field, the vendor code, and the vendor procedure code may be set to "0x90," "0x4B," and "0x31," respectively, as in FIG. 11A (a). In this case, the vendor procedure code may be set to, for example, "0x33" which means an RAS set command according to the embodiment of the present disclosure. The RAS set value may be set to "0x32, 0x00" to configure the operation of the RAS drive unit as 5.0 degrees.

FIG. 11B (b) and (c) illustrate an example of a frame format corresponding to a response message according to the performance of the RAS set command transmitted from the secondary device to the primary device. FIG. 11B (b) corresponds to a message informing that an operation is normally performed, and FIG. 11B (c) corresponds to a message informing that an operation is not normally performed. As illustrated in FIG. 11B (b), the frame for informing of the normal performance of the operation for the RAS set command may include a procedure ID field of one octet, frame length fields of two octets, a return code field of one octet, vendor code fields of two octets, a vendor procedure code field of one octet, and RAS set value fields of two octets.

The value of the procedure ID field, the vendor code, the vendor procedure code, and the RAS set value may be set to "0x90," "0x4B, 0x4D," "0x33," and "0x32, 0x00," respectively, as in FIG. 11B (b). In this case, the return code field may be set to, for example, "0x00" representing the normal performance of the operation (OK).

Referring to FIG. 11B (c), the frame informing of the failure in performance of the operation for the RAS set command may include a procedure ID field of one octet, frame length fields of two octets, and a return code field of at least one octet. In addition, the frame may also further include a vendor procedure code field (not illustrated) of one octet.

The value of the procedure ID field is set to "0x90" as in FIG. 11B (a). In this case, the return code field includes, for example, "0x0B" of one octet representing the failure in performance of the operation. A value of one octet for representing more detailed information on the failure in performance of the operation may be additionally set in the return code field. For example, the value is set to "0x03" representing a jammed status of a driver in FIG. 11B (c).

FIGS. 12A and 12B illustrate format examples of transmission frames between primary and secondary devices for RAB control of a base station antenna according to an embodiment of the present disclosure. FIG. 12A illustrates frames associated with calibration control for adjusting an RAB drive unit to an initial value, and FIG. 12B illustrates frames associated with set control for driving the RAB drive unit with a particular value.

Referring to FIG. 12A, an example of a frame format corresponding to an RAB calibration command transmitted from a primary device to a secondary device is illustrated in FIG. 12A (a). As illustrated in FIG. 12A (a), the corresponding frame may include a procedure ID field of one octet, frame length fields of two octets, vendor code fields of two octets, and a vendor procedure code field of one octet.

The values of each frame are effectively the same as those of the frame corresponding to the RAS calibration command illustrated in FIG. 11A (a). However, the vendor procedure code may be set to, for example, "0x71" which means the RAB calibration command according to the embodiment of the present disclosure.

FIG. 12A (b) and (c) illustrate an example of a frame format corresponding to a response message according to the performance of the RAB calibration command transmitted from the secondary device to the primary device. FIG. 12A (b) corresponds to a message informing that an operation is normally performed, and FIG. 12A (c) corresponds to a message informing that an operation is not normally performed. As illustrated in FIG. 12A (b), the frame for informing of the normal performance of the operation for the RAB calibration command may include a procedure ID field of one octet, frame length fields of two octets, a return code field of one octet, vendor code fields of two octets, and a vendor procedure code field of one octet.

The values of each frame are effectively the same as those of the response frame for the RAS calibration command illustrated in FIG. 11A (b). However, the vendor procedure code may be set to, for example, "0x61" "0x71".

Referring to FIG. 12A (c), the frame informing of the failure in performance of the operation for the RAB calibration command may include a procedure ID field of one octet, frame length fields of two octets, and a return code field of at least one octet. In addition, the frame may also further include a vendor procedure code field (not illustrated) of one octet. The values of each frame may be effectively the same as those of the response frame for the RAS calibration command illustrated in FIG. 11A (c).

Next, referring to FIG. 12B, an example of a frame format corresponding to an RAB set command transmitted from a primary device to a secondary device is illustrated in FIG. 12B (a). As illustrated in FIG. 12B (a), the corresponding frame may include a procedure ID field of one octet, frame length fields of two octets, vendor code fields of two octets, a vendor procedure code field of one octet, and RAB set value fields of two octets, as in FIG. 12B (a).

In this case, the vendor procedure code may be set to, for example, "0x73" which means an RAB set command according to the embodiment of the present disclosure. The RAB set value may be set to "0x53, 0x00" to configure the operation of the RAB drive unit as 8.3 degrees.

FIG. 12B (b) and (c) illustrate an example of a frame format corresponding to a response message according to the performance of the RAB set command transmitted from the secondary device to the primary device. FIG. 12B (b) corresponds to a message informing that an operation is normally performed, and FIG. 12B (c) corresponds to a message informing that an operation is not normally performed. As illustrated in FIG. 12B (b), the frame for informing of the normal performance of the operation for the RAB set command may include a procedure ID field of one octet, frame length fields of two octets, a return code field of one octet, vendor code fields of two octets, a vendor procedure code field of one octet, and RAS set value fields of two octets. In this case, the return code field may be set to, for example, "0x00" representing the normal performance of the operation (OK).

Referring to FIG. 12B (c), the frame informing of the failure in performance of the operation for the RAB set command may include a procedure ID field of one octet, frame length fields of two octets, and a return code field of at least one octet. In this case, the return code includes "0x0B" of one octet representing the failure in performance of the operation. A value of one octet for representing more detailed information on the failure in performance of the operation may be additionally set in the return code field. For example, in FIG. 12B (c), the value is set to "0x0E" representing that the calibration operation is not performed.

FIGS. 13A and 13B illustrate format examples of transmission frames between primary and secondary devices for RET control of a base station antenna having a single band structure according to an embodiment of the present disclosure. FIG. 13A illustrates frames associated with RET calibration control, and FIG. 13B illustrates frames associated with RET set control.

Referring to FIG. 13A, an example of a frame format corresponding to an RET calibration command transmitted from a primary device to a secondary device is illustrated in FIG. 13A (a). As illustrated in FIG. 13A (a), the corresponding frame includes a procedure ID field of one octet and frame length fields of two octets. In this case, the procedure ID field is set to, for example, "0x31" according to the AISG rules.

FIGS. 13 (b) and (c) illustrate an example of a frame format corresponding to a response message according to the performance of the RET calibration command transmitted from the secondary device to the primary device. FIG. 13A (b) corresponds to a message informing that an operation is normally performed, and FIG. 13A (c) corresponds to a message informing that an operation is not normally performed. As illustrated in FIG. 13A (b), the frame informing of the normal performance of the operation for the RET calibration command may include a procedure ID field of one octet, frame length fields of two octets, and a return code field of one octet. In this case, the return code is set to, for example, "0x00" to inform of the normal performance of the operation.

Referring to FIG. 13A (c), the frame informing of the failure in performance of the operation for the RET set command may include a procedure ID field of one octet, frame length fields of two octets, and return code fields of two octets. In this case, the return codes are set to "0x0B" and "0x19", "0x0B" representing the failure in performance of the operation and "0x19" representing detailed information on the failure in performance of the operation, for example, representing an undesignated procedure.

Next, referring to FIG. 13B, an example of a frame format corresponding to an RET set command transmitted from a primary device to a secondary device is illustrated in FIG. 13B (a). As illustrated in FIG. 13B (a), the corresponding frame may include a procedure ID field of one octet, frame length fields of two octets, and RET set value fields of two octets, as in FIG. 13A (a). In this case, the procedure ID field is set to, for example, "0x33." The RET set value may be set to "0x64, 0x00" to configure the operation of the RET drive unit as 10.0 degrees.

FIG. 13B (b) and (c) illustrate an example of a frame format corresponding to a response message according to the performance of the RET set command transmitted from the secondary device to the primary device. FIG. 13B (b) corresponds to a message informing that an operation is normally performed, and FIG. 13B (c) corresponds to a message informing that an operation is not normally performed. As illustrated in FIG. 13B (b), the frame informing of the normal performance of the operation for the RET set command may include a procedure ID field of one octet, frame length fields of two octets, and a return code field of one octet. In this case, the return code field may be set to, for example, "0x00" representing the normal performance of the operation (OK).

Referring to FIG. 13B (c), the frame informing of the failure in performance of the operation for the RET set command may include a procedure ID field of one octet, frame length fields of two octets, and return code fields of two octets. In this case, the return codes are set to "0x0B" and "0x0E", "0x0B" representing the failure in performance of the operation and "0x0E" representing detailed information on the failure in performance of the operation, for example, representing that the calibration operation is not performed.

FIGS. 14A and 14B illustrate format examples of transmission frames between primary and secondary devices for RET control of a base station antenna having a dual band structure according to an embodiment of the present disclosure. FIG. 14A illustrates frames associated with RET calibration control, and FIG. 14B illustrates frames associated with RET set control.

Referring to FIG. 14A, an example of a frame format corresponding to an RET calibration command transmitted from a primary device to a secondary device is illustrated in FIG. 14A (a). As illustrated in FIG. 14A (a), the corresponding frame includes a procedure ID field of one octet, frame length fields of two octets, and an antenna number field of one octet. In this case, the procedure ID field is set to, for example, "0x80" according to the AISG rules. In addition, the antenna number may be set to, for example, "0x01" to inform that the antenna to be controlled is the first antenna.

FIG. 14A (b) and (c) illustrate an example of a frame format corresponding to a response message according to the performance of the RET calibration command transmitted from the secondary device to the primary device. FIG. 14A (b) corresponds to a message informing that an operation is normally performed, and FIG. 14A (c) corresponds to a message informing that an operation is not normally performed. As illustrated in FIG. 14A (b), the frame informing of the normal performance of the operation for the RET calibration command may include a procedure ID field of one octet, frame length fields of two octets, an antenna number field of one octet, and a return code field of one octet. In this case, the procedure ID field is set to, for example, "0x80" according to the AISG rules. In addition, the return code is set to, for example, "0x00" to inform of the normal performance of the operation.

Referring to FIG. 14A (c), the frame informing of the failure in performance of the operation for the RET set command may include a procedure ID field of one octet, frame length fields of two octets, an antenna number field of one octet, and return code fields of two octets. In this case, the return codes are set to "0x0B" and "0x03", "0x0B" representing the failure in performance of the operation and "0x03" representing detailed information on the failure in performance of the operation, for example, representing a jammed status of a driver.

Next, referring to FIG. 14B, an example of a frame format corresponding to an RET set command transmitted from a primary device to a secondary device is illustrated in FIG. 14B (a). As illustrated in FIG. 14B (a), the corresponding frame may include a procedure ID field of one octet, frame length fields of two octets, an antenna number field of one octet, and RET set value fields of two octets, as in FIG. 14A (a). The RAS set value may be set to "0x64, 0x00" to configure the operation of the RAS drive unit as 10.0 degrees. In addition, the antenna number may be set to, for example, "0x02" to inform that the antenna to be controlled is the second antenna.

FIG. 14B (b) and (c) illustrate an example of a frame format corresponding to a response message according to the performance of the RET set command transmitted from the secondary device to the primary device. FIG. 14B (b) corresponds to a message informing that an operation is normally performed, and FIG. 14B (c) corresponds to a message informing that an operation is not normally performed. As illustrated in FIG. 14B (b), the frame informing of the normal performance of the operation for the RET set command may include a procedure ID field of one octet, frame length fields of two octets, an antenna number field of one octet, and a return code field of one octet. In this case, the return code field may be set to, for example, "0x00" representing the normal performance of the operation (OK).

Referring to FIG. 14B (c), the frame informing of the failure in performance of the operation for the RET set command may include a procedure ID field of one octet, frame length fields of two octets, an antenna number field of one octet, and return code fields of two octets. In this case, the return codes are set to "0x0B" and "0x13", "0x0B" representing the failure in performance of the operation and "0x13" representing detailed information on the failure in performance of the operation, for example, representing excess of the drive range.

As described above, the present disclosure provides an antenna of a mobile communication base station which can simplify control target devices installed therein, thereby decreasing costs in regards to the installation of the devices, reducing installation space and weight, and more efficiently controlling the devices by the main system of the base station.

The configurations and the operations of the antenna system of the mobile communication base station according to the embodiment of the present invention may be made as described above, and although the specific embodiment of the present invention has been described above, various modifications can be made without departing from the scope of the present invention. Accordingly, the scope of the present invention shall not be determined by the above-described embodiments, and is to be determined by the following claims and their equivalents.

What is claimed is:

1. An antenna of a mobile communication base station, comprising:
 a Remote Electrical Tilt (RET) drive unit, a Remote Azimuth Steering (RAS) drive unit, and a Remote Azimuth Beam-width (RAB) drive unit that drive electrical and mechanical apparatuses for adjusting Remote Electrical Tilt (RET), Remote Azimuth Steering (RAS), and Remote Azimuth Beam-width (RAB), respectively, each of which comprises a drive motor; and
 a multifunctional device that communicates with a main system of the base station to receive control signals for the RET, RAS, and RAB control and controls the driving of the RET drive unit, the RAS drive unit, and the RAB drive unit, wherein the multifunctional device regards the main system of the base station as a primary device according to the Antenna Interface Standards Group (ASIG) rules and controls the RET, the RAS, and the RAB by transmitting/receiving a High-level Data-Link Control (HDLC) message to/from the main system of the base station, and wherein the multifunctional device receives the HDLC message from the primary device, identifies whether the received HDLC message corresponds to an Information Frame (I-Frame) format, extracts a procedure ID from the corresponding I-Frame, identifies an information set in advance to control the RAS or the RAB, controls the RAS or the RAB set in advance according to the identified vendor procedure code, and informs the primary device of a result obtained by controlling the RAS or the RAB through a response message.

2. The antenna of claim 1, wherein the multifunctional device is connected to the outside through an Antenna Interface Standards Group (AISG) connector placed on a lower cap of the antenna and receives an external DC+RS485 signal through the AISG connector using an AISG cable.

3. The antenna of claim 1, wherein the antenna has a multi-band structure, one RET drive unit, one RAS drive unit, and one RAB drive unit are provided for each transmission/reception antenna implementing the multi-band, and the multifunctional device controls the RET drive unit, the RAS drive unit, and the RAB drive unit.

4. A method of controlling an antenna of a mobile communication base station that is a secondary device performing a control operation by transmitting/receiving a High-level Data-Link Control (HDLC) message according to the Antenna Interface Standards Group (AISG) rules to/from a primary device, the method comprising:

receiving the HDLC message from the primary device;
identifying whether the received HDLC message corresponds to an Information Frame (I-Frame) format and extracting a procedure ID from the corresponding I-Frame;
identifying whether the current I-Frame is associated with a vendor procedure set in advance as a vendor specific procedure, by identifying the extracted procedure ID, and identifying a vendor procedure code that is information set in advance to control Remote Azimuth Steering (RAS) or Remote Azimuth Beam-width (RAB);
controlling the RAS or the RAB set in advance according to the identified vendor procedure code; and
informing the primary device of a result obtained by controlling the RAS or the RAB through a response message.

5. The method of claim 4, further comprising:
identifying whether the corresponding procedure ID is a procedure ID set in advance for Remote Electrical Tilt (RET) control, when the I-Frame is not associated with the vendor procedure; and
performing the RET control when the corresponding procedure ID is identified to be the procedure ID for the RET control.

6. The method of claim 4, wherein a frame associated with the vendor procedure comprises a procedure ID field (PID) of one octet, frame length fields of two octets, vendor code fields of two octets, and a vendor procedure code field of one octet.

7. The method of claim 6, wherein the frame associated with the vendor procedure further comprises RAB or RAS set value fields of two octets.

8. The method of claim 4, wherein the response message comprises a message for informing of normal performance of an operation and a message for informing of failure in performance of an operation, a frame of the message for informing of normal performance of an operation comprises a procedure ID field of one octet, frame length fields of two octets, a return code field of one octet, vendor code fields of two octets, and a vendor procedure code field of one octet, and a frame of the message for informing of the failure in performance of an operation comprises a procedure ID field of one octet, frame length fields of two octets, and a return code field of at least one octet.

9. An antenna of a mobile communication base station, comprising:

an RET drive unit, an RAS drive unit, and an RAB drive unit that drive electrical and mechanical apparatuses for adjusting Remote Electrical Tilt (RET), Remote Azimuth Steering (RAS), and Remote Azimuth Beam-width (RAB), respectively, each of which comprises a drive motor; and a multifunctional device that communicates with a main system of the base station to receive control signals for the RET, RAS, and RAB control and controls the driving of the RET drive unit, the RAS drive unit, and the RAB drive unit wherein the multifunctional device regards the main system of the base station as a primary device according to the Antenna Interface Standards Group (AISG) rules and controls the RET, the RAS, and the RAB by transmitting/receiving a High-level Data-Link Control (HDLC) message to/from the main system of the base station, and wherein the multifunctional device receives the HDLC message from the primary device, identifies whether the received HDLC message corresponds to an Information Frame (I-Frame) format, extracts a procedure ID from the corresponding I-Frame, identifies whether the current I-Frame is associated with a vendor procedure set in advance as a vendor specific procedure, by identifying the extracted procedure ID, identifies a vendor procedure code that is information set in advance to control the RAS or the RAB, controls the RAS or the RAB set in advance according to the identified vendor procedure code, and informs the primary device of a result obtained by controlling the RAS or the RAB through a response message.

10. The antenna of claim 9, wherein the multifunctional device is connected to the outside through an Antenna Interface Standards Group (AISG) connector placed on a lower cap of the antenna and receives an external DC+RS485 signal through the AISG connector using an AISG cable.

11. The antenna of claim 9, wherein the antenna has a multi-band structure, one RET drive unit, one RAS drive unit, and one RAB drive unit are provided for each transmission/reception antenna implementing the multi-band, and the multifunctional device controls the RET drive unit, the RAS drive unit, and the RAB drive unit.

* * * * *